Patented Dec. 11, 1945

2,390,576

UNITED STATES PATENT OFFICE 2,390,576

PREPARATION OF CARBOXYLIC ACIDS

Mark W. Farlow and Gerald M. Whitman, Brandywine Hundred, Del., assignors to E. I. du Pont de Nemours & Company, Wilmington, Del., a corporation of Delaware No Drawing. Application February 22, 1944, Serial No. 523,484

4 Claims. (Cl. 260—530)

This invention relates to the preparation of carboxylic acids.

Carboxylic acids and especially aliphatic polycarboxylic acids are widely used in the preparation of condensation polymers such as polyamides, polyesters, alkyd resins, and the like. The methods available for the preparation of polycarboxylic acids are not entirely satisfactory because said acids are generally obtained by degrading larger molecules. This, of course, operates to increase costs because of material losses in the synthesis and generally poor yields inherent in the reactions in question. In the case of a number of dicarboxylic acids, such as malonic and glutaric acids, succinic and other dicarboxylic acids containing an even number of carbon atoms, special synthesis methods have to be employed. It has now been discovered that in the presence of certain chromites, more fully described hereinafter, carbonyl compounds, containing an active hydrogen atom on a carbon adjacent to the carbonyl carbon atom, can be successfully converted into carboxylic acids with carbon dioxide and water.

It is accordingly an object of this invention to provide a practicable and economical catalytic method for preparing carboxylic acids from carbonyl compounds in which there is at least one hydrogen atom on a carbon adjacent to the carbonyl carbon. It is another object to provide a simple, practicable, and economical catalytic method for preparing dicarboxylic acids from cyclic ketones. Other objects will be apparent from the following description of the invention.

These and other objects and advantages are accomplished by the hereindescribed invention which broadly comprises contacting a carbonyl compound, containing at least one hydrogen atom attached to a carbon atom adjacent to the carbonyl carbon atom, with carbon dioxide and water in the presence of a chromite of a hydrogenating metal whose oxide is difficultly reducible, at an elevated temperature and at a pressure in excess of atmospheric pressure.

In a preferred embodiment of this invention, a carbonyl compund containing a hydrogen atom attached to a carbon atom adjacent to the carbonyl carbon atom is charged into a pressure reactor together with water and chromite of a hydrogenating metal whose oxide is difficultly reducible as a catalyst. The reactor is closed, charged with carbon dioxide in amount sufficient to provide at least 1 mole of the carbon dioxide per mole of the carbonyl compound present, and the reaction mixture is heated between 100° and 450° C. until there is no further drop in pressure. If desired, the pressure in the reactor may be maintained at the desired point by periodically repressuring with carbon dioxide. After the reaction is complete, as evidenced by no further drop in pressure, the reaction mixture is allowed to cool and is filtered to separate the catalyst. The carboxylic acids formed are separated from the crude reaction mixture by methods well known to the art.

The exact manner for practicing this invention will vary depending upon the particular compounds processed. The following example, in which proportions are given in parts by weight unless otherwise specified, is given for illustrative purposes and is not intended to place any restrictions or limitations on the hereindescribed invention:

In a silver-lined pressure vessel, there is placed 24.5 parts of cyclohexanone, 25 parts of water, 52.5 parts of sodium bicarbonate, 22.5 parts of glacial acetic acid (sealed in a thin-walled glass ampule), and 2 parts of manganese chromite catalyst, previously treated with hydrogen for 4 hours at 400° C. The reaction vessel is closed, agitated to break the glass ampule containing the acetic acid, and heated for 20 hours at 300° C. The reaction vessel is allowed to cool, opened, the contents removed by washing with water, and the water solution filtered to remove the catalyst. The filtrate is partially evaporated to remove unchanged cyclohexanone and the residual water solution is acidified with hydrochloric acid and filtered to remove the precipitated pimelic acid. Evaporation of the filtrate to dryness followed by extraction of the residual solid with benzene yields a small amount of adipic acid.

The yield of pimelic acid, allowing for recovered cyclohexanone, is almost quantitative.

The above example illustrates the conversion of cyclohexanone to pimelic and adipic acids. The invention is not, however, limited to these specific compounds.

The catalytic conversion of all carbonyl compounds, containing at least one hydrogen atom attached to a carbon atom adjacent to the carbonyl carbon atom, by means of carbon dioxide and water in the presence of a chromite of a hydrogenating metal whose oxide is difficultly reducible is contemplated within the scope of this invention.

Hydrogenating metals whose oxides are difficultly reducible are manganese, zinc and magnesium.

As hereinbefore stated, any carbonyl compound which contains at least one hydrogen atom attached directly to a carbon atom adjacent to the carbonyl carbon atom may be treated in accordance with our novel process. By the term "carbonyl compound" as employed herein and in the appended claims is of course meant a compound selected from the group consisting of aldehydes and ketones, including alicyclic, aliphatic, aryl-alkyl and diaralkyl ketones. Specific examples of aldehydes contemplated are propionaldehyde, butyraldehyde, heptaldehyde and the like; while specific examples of alicyclic ketones are cyclopentanone, cyclohexanone, cycloheptanone and the like; specific examples of aliphatic ketones are acetone, methyl ethyl ketone, dipropyl ketone, diisopropyl ketone, methyl cyclohexyl ketone and the like; specific examples of aryl-alkyl ketones are acetophenone, propionphenone, methyl naphthyl ketone and the like; and specific examples of diaralkyl ketones are dibenzyl ketone, diphenyl-ethyl ketone and the like. Said carbonyl compounds contain at least one active hydrogen atom on a carbon atom adjacent to the carbonyl carbon atom.

The carbon dioxide can be generated in situ by reaction of a carbonate with an acid, as exemplified, or it can be preformed and forced into the reactor under pressure, or it can be charged in the solid form before the reaction vessel is closed. If commercial carbon dioxide is used it should be free of harmful impurities such as sulfur compounds, oxygen, etc.

Although in the example certain conditions of temperature, pressure, concentration, duration of reaction, catalyst, etc., have been indicated, it is to be understood that these values can be varied somewhat within the scope of this invention because the conditions of each experiment are determined by the particular compounds treated, the quantity employed, the catalyst, etc. In general, the process of this invention is operable at temperatures ranging from 100° to 450° C. at pressures above atmospheric to a maximum determined by the practical limitations of the equipment used.

The proportion of catalyst employed may be varied considerably. As a rule, an amount of catalyst is used that will bring about reaction at a suitable rate; this is generally from about 1% to 10% based upon the weight of the carbonyl compound being treated. Various proportions of starting materials can be employed depending upon the operating conditions chosen. Ordinarily, the molar ratio of carbon dioxide to carbonyl compound should be at least 1:1; and the molar ratio of water to carbonyl compound should also be at least 1:1. Generally, however, in view of the superior yields thereby obtained, it is preferred that the molar ratio of carbon dioxide to carbonyl compound, and also the molar ratio of water to carbonyl compound, should be at least 2:1, i. e., for every mole of carbonyl compound introduced into the reaction vessel there should also be introduced at least 2 moles of carbon dioxide and at least 2 moles of water.

The apparatus which can be employed for conducting these reactions can be of any convenient type suitable for operation under superatmospheric pressures. Owing to the highly corrosive action of carbon dioxide solutions at high temperatures, the vessel should be one which is made of or lined with corrosion resistant materials. Suitable equipment is one lined with glass, one having the inner surfaces plated with chromium or silver or one made of an acid-resistant alloy steel, for example, alloys containing high proportions of molybdenum, cobalt, tungsten, chromium, manganese or nickel.

Purification of the carboxylic acids so produced can be effected in various ways. Thus, the crude reaction mixture can be converted to a readily distillable ester which is then purified by fractionation. The carboxylic acids can be separated by fractional precipitation or by crystallization of metallic salts or of the free acids in those instances in which solid crystalline products are obtained. Selective oxidation of accompanying impurities also aids in the isolation of the desired product. The carboxylic acids obtained by the process of this invention and especially the dibasic acids are useful in the preparation of condensation products such as polyamides, which are of value as coating compositions for textiles, fibers and the like, and also alkyd resins which are of special utility as protective coating compositions.

As many apparently widely different embodiments of this invention may be made without departing from the spirit and scope thereof, it is to be understood that we do not limit ourselves to the specific embodiments thereof except as defined in the appended claims.

Having described the present invention, the following is claimed as new and useful:

1. The process for obtaining a carboxylic acid, which comprises contacting a carbonyl compound, containing at least one hydrogen atom attached to a carbon atom adjacent to the carbonyl carbon atom, with carbon dioxide and water in the presence of a chromite of a hydrogenating metal whose oxide is difficultly reducible, at an elevated temperature within the range of from 100° C. to 450° C. and at a pressure in excess of atmospheric pressure.

2. The process for obtaining a carboxylic acid, which comprises admixing, at a temperature within the range of from 100° C. to 450° C. and under superatmospheric pressure, water, carbon dioxide, a carbonyl compound containing at least one hydrogen atom attached to a carbon atom adjacent to the carbonyl carbon atom, and from 1% to 10% based on the weight of the carbonyl compound of a chromite of a hydrogenating metal whose oxide is difficultly reducible, the molar ratio of carbon dioxide to carbonyl compound being at least 1:1 and the molar ratio of water to carbonyl compound being at least 1:1.

3. The process for obtaining a dicarboxylic acid which comprises admixing, at a temperature within the range of from 100° C. to 450° C. and under superatmospheric pressure, water, carbon dioxide, an alicyclic ketone and from 1% to 10% based on the weight of the ketone of a chromite of a hydrogenating metal whose oxide is difficultly reducible, the molar ratio of carbon dioxide to carbonyl compound being at least 1:1 and the molar ratio of water to carbonyl compound being at least 1:1.

4. The process for obtaining pimelic acid which comprises admixing, at a temperature within the range of from 100° C. to 450° C. and under superatmospheric pressure, water, carbon dioxide, cyclohexanone and from 1% to 10% based on the weight of the cyclohexanone of manganese chromite, the molar ratio of carbon dioxide to cyclohexanone being at least 2:1 and the molar ratio of water to cyclohexanone being at least 2:1.

MARK W. FARLOW.
GERALD M. WHITMAN.